H. E. PIM.
PASSENGER REGISTER FOR PUBLIC VEHICLES.
APPLICATION FILED JUNE 8, 1908.
920,993.
Patented May 11, 1909.
4 SHEETS—SHEET 1.
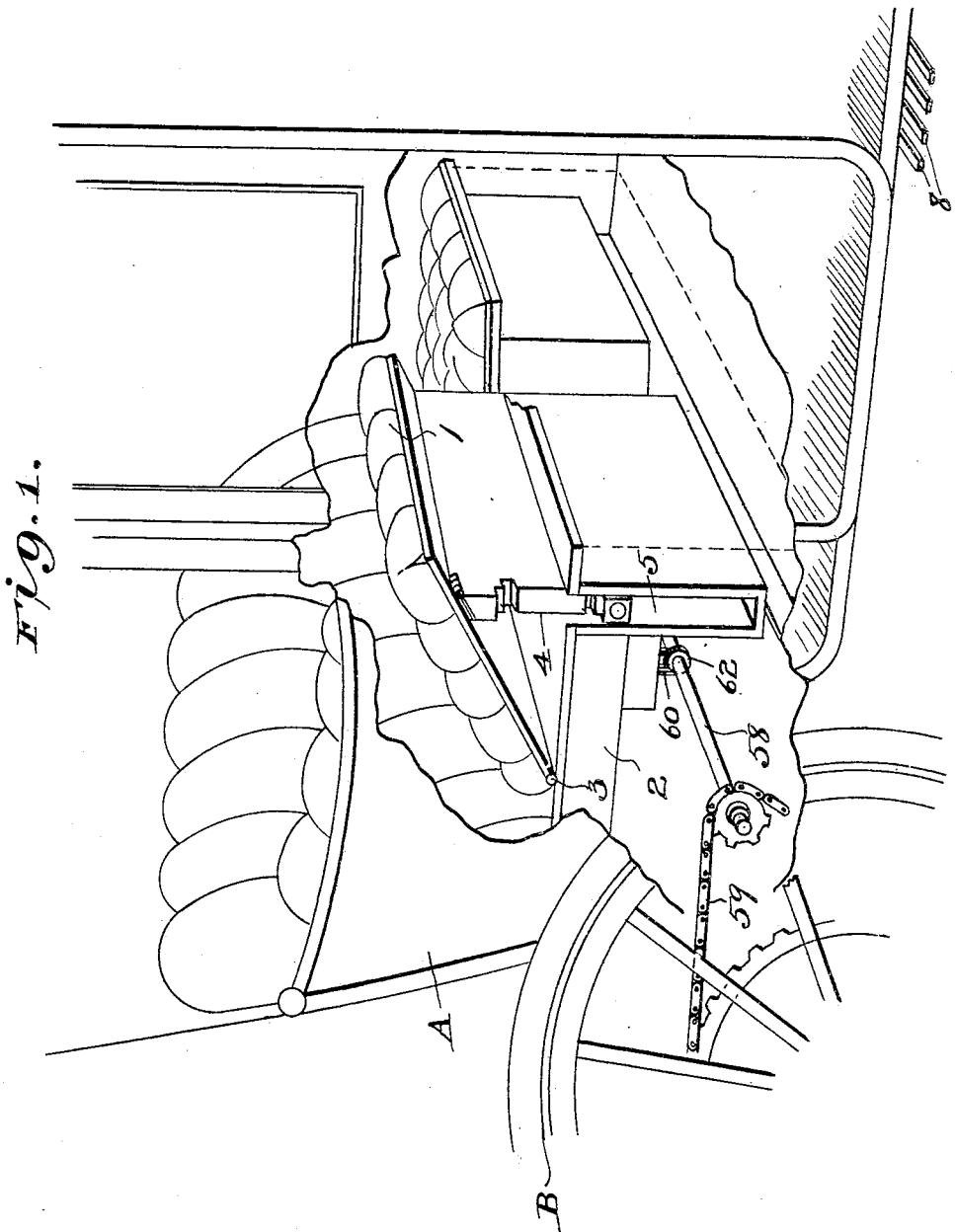

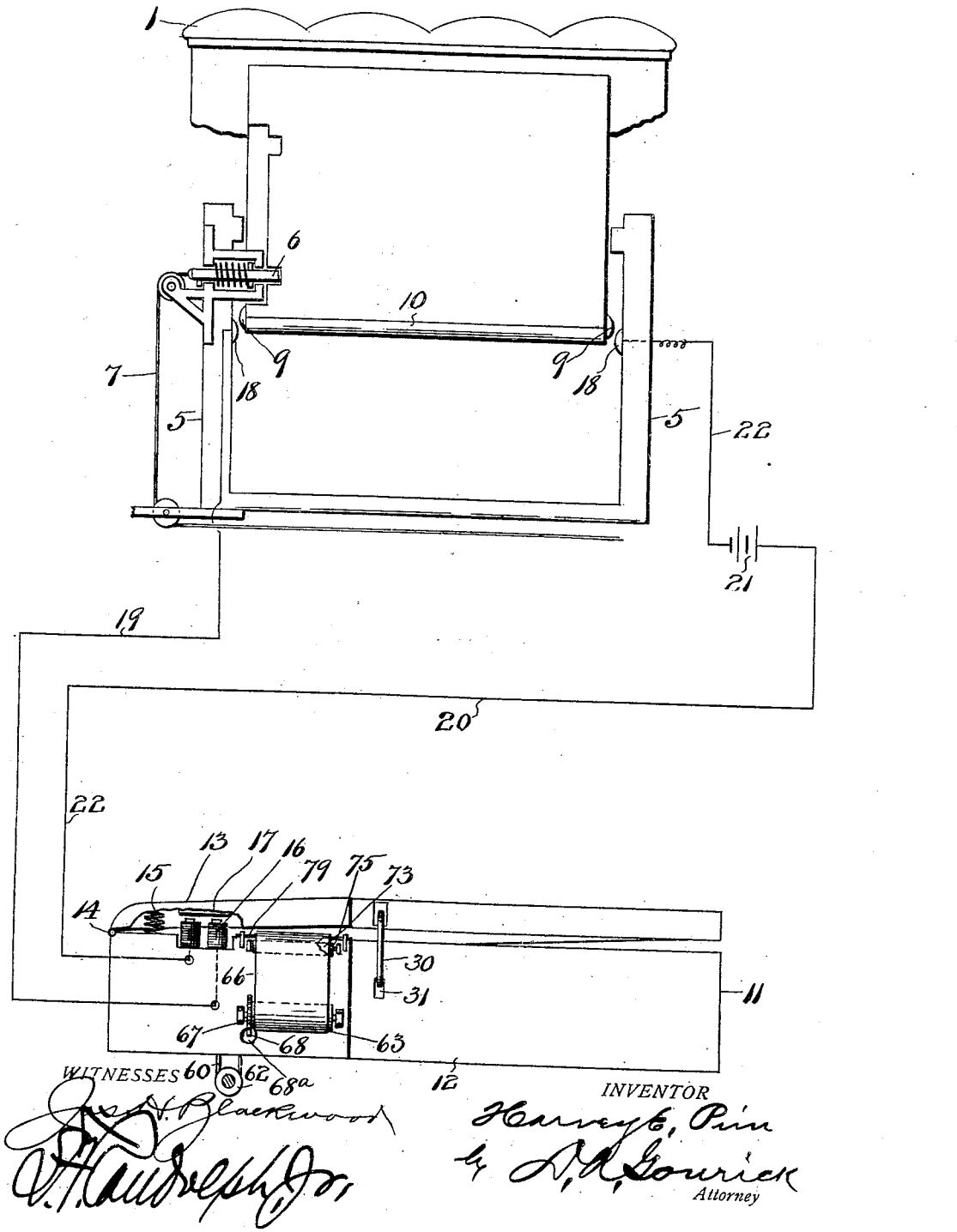

H. E. PIM.
PASSENGER REGISTER FOR PUBLIC VEHICLES.
APPLICATION FILED JUNE 8, 1908.
920,993.
Patented May 11, 1909.
4 SHEETS—SHEET 3.
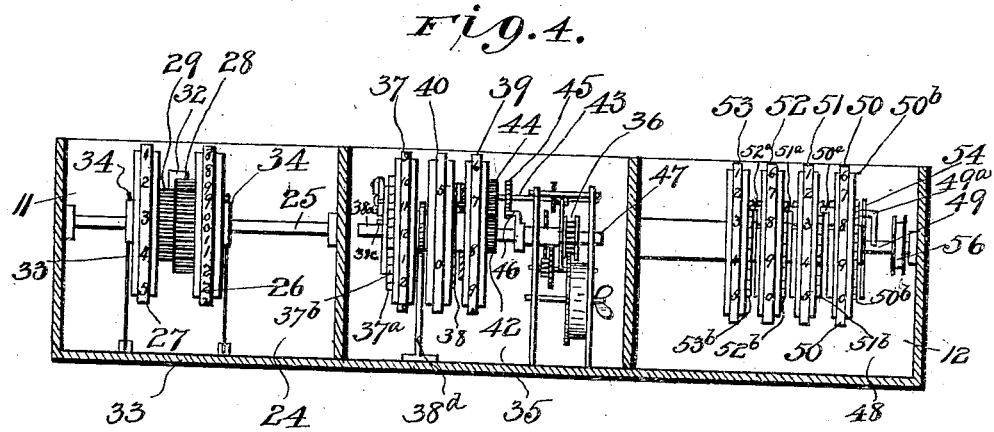
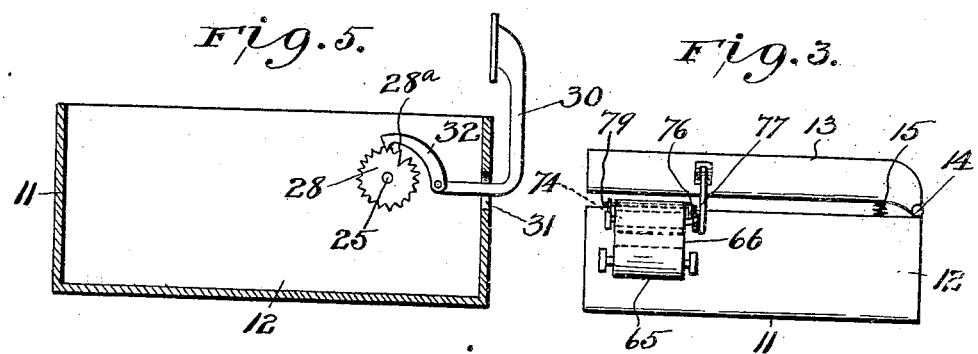
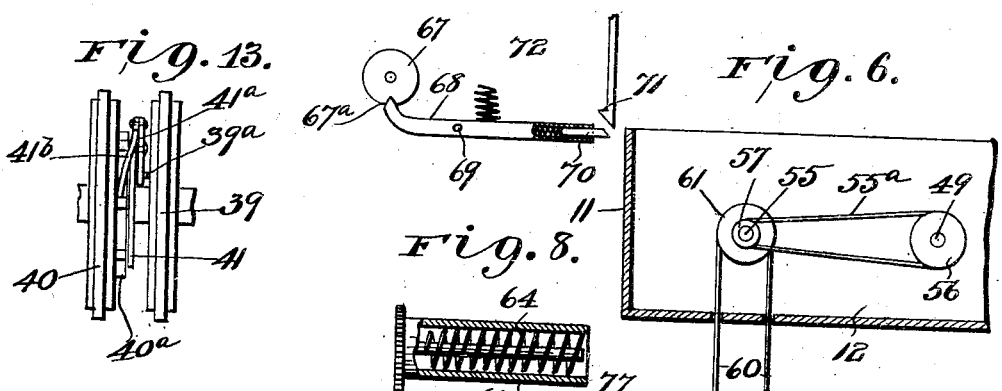
WITNESSES
INVENTOR
Harry E. Pim
by D. A. Gowrick
Attorney H. E. PIM.
PASSENGER REGISTER FOR PUBLIC VEHICLES.
APPLICATION FILED JUNE 8, 1908.
920,993.
Patented May 11, 1909.
4 SHEETS—SHEET 4.
Fig. 10.
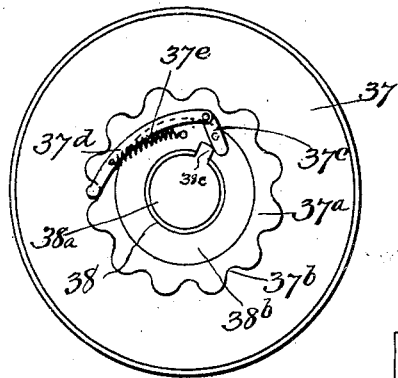
Fig. 12.
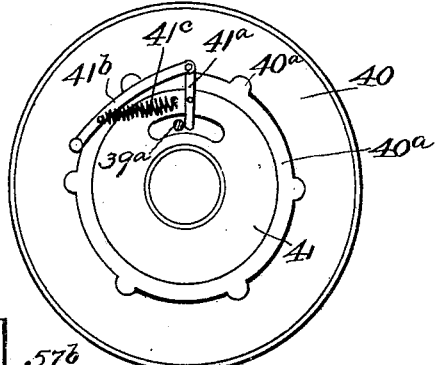
Fig. 14.
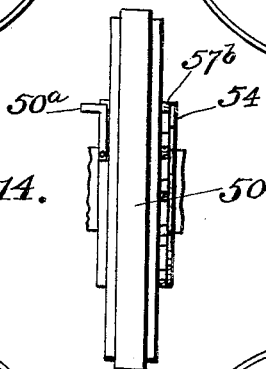
Fig. 11.
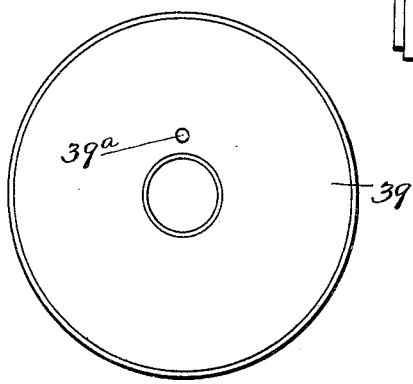
Fig. 15.
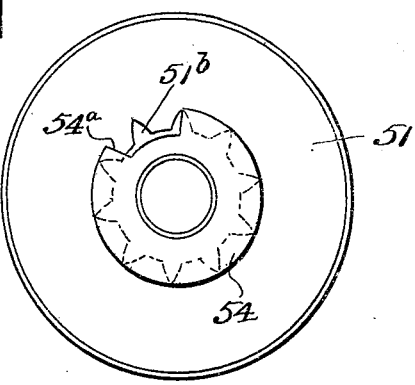
Fig. 9.
WITNESSES
Jos H Blackwood
V.F. Randolph Jr.
INVENTOR
Harry E. Pim,
by H. A. Gourick
Attorney

UNITED STATES PATENT OFFICE.

HARVEY E. PIM, OF LINCOLN, NEBRASKA.

PASSENGER-REGISTER FOR PUBLIC VEHICLES.

No. 920,993.　　　　Specification of Letters Patent.　　　　Patented May 11, 1909.

Application filed June 3, 1908.　Serial No. 437,452.

*To all whom it may concern:*

Be it known that I, HARVEY E. PIM, a citizen of the United States, residing at Lincoln, in the county of Lancaster and State of Nebraska, have invented certain new and useful Improvements in Passenger-Registers for Public Vehicles, of which the following is a specification.

My invention relates to devices for registering passengers in cabs, carriages, etc., and has for its object the provision of a device so constructed as to register the number of passengers carried by the vehicle, the time each passenger occupied the vehicle and the distance traveled by each passenger. This I accomplish by having each seat pivotally secured and held in a raised position when not occupied. When a passenger enters the vehicle the driver lowers one of the seats which in lowering momentarily closes a circuit so as to register the time, the number of passenger that is to occupy the seat and the distance the vehicle had traveled to that time. When the passenger leaves the vehicle the driver raises the seat which again closes the circuit and registers the number of passenger again and the time and distance traveled at that time. The registration is made on a paper ribbon so that the correctness of the driver's returns at the end of any period can be verified.

My improved passenger register will be described hereinafter and illustrated in the accompanying drawings in which—

Figure 1 is a fragmental view of a vehicle partly broken away showing my improved register installed therein, Fig. 2, is a view of one of the seats and its register showing the electric circuit for operating the printing attachment of the register, Fig. 3, a view of the opposite end of the register casing to that shown in Fig. 2, Fig. 4, a longitudinal sectional view of the register, Fig. 5, a cross section of the mechanism for registering the number of passengers, Fig. 6, a cross-section of the mechanism for registering the distance traveled, Fig. 7, a detail view of the mechanism for operating the paper roll, Fig. 8, a longitudinal sectional view of the paper roll, Fig. 9, a fragment of the paper ribbon showing the record therein, Fig. 10, an enlarged view of the hour recording wheel and the step by step mechanism for rotating it, Fig 11, a view of the minute recording wheel, Fig. 12. a view of the ten minute recording wheel, Fig. 13, an enlarged view of the minute and ten minute recording wheels and the operating mechanism connecting them, Figs. 14 and 15, side and end views of one of the distance recording wheels, and Fig. 16, a detail view of the operating mechanism for the ink ribbon roll.

In the drawings similar reference characters indicate corresponding parts throughout the several views.

A indicates the body of a vehicle and B one of the wheels.

The cushions 1 are mounted on the seats 2 by means of rollers 3 and have supports 4 hinged thereto that fit in sockets 5 in the seats and are held in a raised and lowered position by means of spring propelled pins 6 operated by flexible connections 7 which are in turn operated by pedals 8 placed in any convenient position outside of the vehicle for operation by the driver.

9 indicates contact buttons secured to each support 4 and connected by means of a wire 10.

11 indicates the casing of the register having a fixed portion 12 and the top portion 13 secured by means of hinges 14 to said fixed portion.

15 indicates a spring to hold the top portion 13 in a normally raised position.

16 indicates an electro-magnet secured to the fixed portion 12 and 17 an armature plate secured to the top 13.

18 indicates contact buttons on the inside of sockets 5 so positioned as to be engaged by contact buttons 9 when the cushion is raised or lowered.

19 indicates a wire running from one button 18 to the magnet 16, 20 a wire connecting the magnet with one pole of a battery 21 and 22 a wire connecting the other pole of the battery and the remaining contact button 18.

It will be understood from this construction that when the cushion 1 is raised or lowered the contact buttons 9 engage the contact buttons 18, momentarily, so as to close the circuit between the battery 21 and the electro-magnet 16. When the electro-magnet is energized by the current as stated it attracts the armature 17 thus drawing the top 13 downwardly and after the contact buttons 9 and 18 are separated the top is raised by means of coil spring 15.

The inside of casing 12 is divided into three compartments. In compartment 24 is secured a shaft 25 on which is mounted two wheels 26 and 27. The wheel 26 has the digits "0" to "9" on its periphery, each digit repeated while the wheel 27 has the digits from "1" to "9" on its periphery.

28 indicates a ratchet wheel on the inner side of wheel 26 and 29 a ratchet wheel on the side of wheel 27 smaller in diameter than ratchet wheel 28.

30 indicates an arm secured to top 13 and extending through a slot 31 in the side of casing 12 and 32 a gravity pawl pivotally secured to the end of arm 30 and engaging the teeth of ratchet wheel 28 so that each time the top 13 is swung downwardly by the attraction of the electro-magnet 16, as above described, the pawl 32 rotates the wheel 26 the space of one of the digits on its periphery. One of the notches in ratchet wheel 28, indicated by 28$^a$ is deeper than the other notches so that at each complete revolution of the wheel 26 the pawl 32 engages the ratchet wheel 29 and turns it with wheel 27 one space so that the next succeeding digit on its periphery is exposed. By this construction it will be understood that with the two wheels the register will record from 1 to 99 making each succeeding numeral twice.

33 indicates leaf springs secured to the register casing and engaging a shoulder 34 on the outer sides of wheels 26 and 27 to hold them from rotation except when turned by pawl 32 as above described.

In compartment 35 of casing 12 is installed a spring motor 36.

37 indicates a wheel with the numerals from "1" to "12" on its periphery and mounted on hollow bearing 38 on the minute hand stem 38$^a$. The wheel 37 has a ratchet wheel 37$^a$ secured thereto with twelve notches 37$^b$ therein, one for each of the numerals in the periphery of wheel 37.

38$^b$ indicates a collar secured to the hollow bearing 38.

37$^c$ indicates a trip lever fulcrumed on collar 38$^b$ having one arm adapted to be engaged by a lug or projection 38$^c$ on minute hand stem 38$^a$, and a pawl 37$^d$ pivotally secured to its other arm and engaging the teeth of ratchet wheel 37$^a$, the end of the pawl being held in engagement with the teeth of said ratchet wheel by means of spring 37$^e$.

38$^d$ indicates a support for sleeve 38.

From this description it will be understood that the stem 38$^a$ makes a complete rotation each hour and at the end of the hour the projection 38$^c$ engages the trip lever 37$^c$ and swings it so that the pawl 37$^d$ moves the wheel 37 the distance of one of the teeth 37$^b$ of ratchet wheel 37$^a$ and exposes the next succeeding digit on its periphery.

39 and 40 indicate other wheels rotatably mounted on hollow bearing or sleeve 38, the wheel 39 having the digits "0" to "9" arranged on its periphery and the wheel 40 the digits "0" to "5" arranged on its periphery, the wheels 39 and 40 being connected by means of a ratchet and pawl movement consisting of a ratchet wheel 40$^a$ secured to the side of wheel 40, a collar 41 extending from the hollow bearing or sleeve 38, a lever 41$^a$ fulcrumed thereon having a pawl 41$^b$ pivotally secured to said lever and adapted to engage the teeth of ratchet wheel 40$^a$.

39$^a$ indicates a pin to engage the free arm of lever 41$^a$ and swing it so as to move wheel 40 one-sixth of a complete revolution each time the wheel 39 makes one complete revolution.

41$^c$ indicates a coil spring to return the pawl to its normal position after being actuated as described.

The wheel 39 has a gear wheel 42 secured on its outer side.

43 indicates a shaft journaled in the spring motor casing and having a gear-wheel 44 keyed thereto and meshing with gear wheel 42.

45 indicates a toothed wheel secured to shaft 43 and arranged to be struck by the dog 46 secured to sleeve 47 mounted on the minute hand stem 38. The sleeve 47 and dog 46 make a complete rotation each minute and the gearing 42 and 44 is so arranged that the wheel 39 is thereby given a step by step motion exposing one of the digits on its periphery at each step.

48 indicates the third compartment in casing 12 in which is journaled a shaft 49 having wheels 50, 51, 52 and 53 mounted thereon, all of said wheels having the digits "0" to "9" on their peripheries, the wheel 50 recording tenths of miles, the wheel 51, miles, the wheel 52 ten miles, and wheel 53 hundred miles.

The shaft 49 and each of the wheels 50, 51, and 52 are provided with a spring pin 49$^a$, 50$^a$, 51$^a$, and 52$^a$ and wheels 50 51, 52 and 53 are provided with ratchet faces 50$^b$, 51$^b$, 52$^b$ and 53$^b$ the teeth of which are positioned to be engaged by spring pins 49$^a$, 50$^a$, 51$^a$ and 52$^a$ respectively.

54 indicates collars secured to shaft 49 and having a portion cut away as shown at 54$^a$ so that only one tooth of the ratchets 50$^b$, 51$^b$, 52$^b$ and 53$^b$, is exposed to the action of spring pins 50$^a$, 51$^a$ and 52$^a$ at a time and as soon as it is moved to the end of the cut away portion 54$^a$ the pins are moved from engagement with the ratchets aforesaid.

55 indicates another shaft journaled in compartment 48 which is geared to shaft 49 by means of belt 55$^a$ and pulleys 56 and 57 keyed to shafts 49 and 55 respectively.

58 indicates a shaft journaled under the vehicle body A and geared to the wheel B by chain and sprocket gearing 59, the shafts 55 and 58 being geared together by means of belt 60 and pulleys 61 and 62 keyed to shafts 54 and 58 respectively.

It will be understood by the construction of parts in compartment 48 that as the vehicle progresses the wheels 50, 51, 52 and 53 are rotated so as to record the miles and fractions of a mile.

63 indicates a roller, journaled at one end of casing 12, that is propelled by a coil spring 64 similarly to the means for actuating the spring roller of a window shade. 65 indicates another roller at the other end of the casing 12 and 66 a paper ribbon secured to said rollers.

67 indicates a flange on one end of roller 63 and having a notch 67ª therein to receive the end of lever 68 projecting through hole 68ª in the side of casing 12, said lever being fulcrumed at 69 on the inside of said casing and having a spring propelled pin 70 in its other end to engage a hook 71 secured to the top 13.

72 indicates a coil spring that holds the end of lever 68 normally in engagement with the notch 67ª in flange 67.

73 and 74 indicate rolls journaled on the two ends of casing 12 and 75 an ink ribbon secured to the rolls.

76 indicates a ratchet wheel secured to the shaft of roller 74 and 77 an arm secured to top 13 and having a pawl 78 secured on its free end that engages ratchet wheel 76 and rotates the roll 74.

79 indicates rods secured to the ends of casing 12 to guide the paper ribbon 66 and prevent it from contacting with the ink ribbon rolls 73 and 74.

It will be understood from the above description and an inspection of the drawings that when the top 13 is drawn downwardly by the electro-magnet 16 because of a passenger entering the vehicle and the driver lowering the cushion connected with the circuit, the recording wheels inside of casing 12 will print on the paper ribbon the number of the passenger occupying the seat and the time the passenger enters the vehicle and the distance traveled by the vehicle to that time. When the top 13 is raised the lever 68 is also raised so that its end does not engage the notch 67ª in flange 67 for an instant and the roller 63 is free to rotate under the impulse of spring 64 so as to wind the paper ribbon 66 thereon and present a fresh surface for the record when the passenger leaves the vehicle. When the cushion is raised after the passenger leaves the vehicle the top is again actuated downwardly when the register will again record the number of the passenger, the time when he left the vehicle and the total distance the vehicle had traveled to that time. The inspector by deducting the time when the passenger entered the vehicle and the time that he left it and the distance it had traveled when he entered and when he left can ascertain if the driver has made a correct return for the passenger.

Having thus described my invention what I claim is—

1. In a passenger register for vehicles, the seat cushions pivotally secured, supports for said cushions pivotally secured thereto, casings containing a register for each cushion and having pivoted tops, means to actuate said casing tops, and the cushion supports operatively connected with the top actuating means.

2. In a passenger register for vehicles, the seat cushions pivotally secured, supports for said cushions pivotally secured thereto, casings containing a register for each cushion and having pivoted tops, electro magnets for actuating said casing tops, and means secured to said cushion supports to control the current to said electro magnets.

3. In a passenger register for vehicles, seats having sockets, cushion supports slidably mounted in said sockets, the seat cushions pivotally secured to said supports, casings containing registers for the cushions and having pivoted tops, electro-magnets for actuating said casing tops, contact buttons in the sockets in the seats and in circuit with said electro-magnet, and contact buttons on the seat supports in circuit with each other and arranged to engage the buttons in the seat sockets.

4. In a passenger register for vehicles, in combination with the seats, and seat cushions therein, a casing having a pivoted top arranged to be actuated by the seat cushions, said casing divided into a plurality of compartments, a passenger register in one compartment comprising recording wheels, means secured to the pivoted top for actuating said recording wheels, a time register and a distance register in other compartments of the casing, and a record receiving device controlled by said casing top.

5. In a passenger register for vehicles, in combination with the seats, and seat cushions therein, a casing having a pivoted top, mechanism controlled by movement of the seat cushions to actuate the pivoted top, said casing divided into a plurality of compartments, a passenger register in one compartment consisting of wheels having a series of digits on their periphery, ratchet wheels secured to said wheels, an actuating device secured to the casing top and engaging said ratchet wheels, a time register and a distance register in other compartments of the casing, and a record receiving device controlled by said casing top.

6. In a passenger register for vehicles, in combination with the seats, and seat cushions therein, a casing having a pivoted top, mechanism controlled by movement of the seat cushions to actuate the pivoted top, said casing divided into a plurality of compartments, a passenger register in one compartment consisting of wheels having ratchet wheels secured thereto, one of said wheels having the digits "0" to "9" arranged thereon in pairs, the other wheel having the digits "1" to "9" arranged thereon in succession, an arm secured to the pivoted casing top having a pawl pivotally secured thereto to engage said ratchet wheels, a time register and a distance register in other compartmnts of the casing, and a record receiving device controlled by said casing top.

7. In a passenger register for vehicles, in combination with the seats, and seat cushions therein, a casing having a pivoted top, mechanism controlled by movement of the seat cushions to actuate the pivoted top, said casing divided into a plurality of compartments, a passenger register in one compartment controlled by the casing top, a clock-work in another compartment having registering wheels operatively connected therewith, a distance register in a third compartment, and a record receiving device controlled by said casing top.

8. In a passenger register for vehicles, in combination with the seats, and seat cushions therein, a casing having a pivoted top, mechanism controlled by movement of the seat cushions to actuate the pivoted top, said casing divided into a plurality of compartments, a passenger register in one compartment controlled by the casing top, a clock-work in another compartment having registering wheels operatively connected therewith, one of said wheels secured to the hour stem and having the numbers of the hours from "1" to "12" on its periphery, the minute recording wheels given a step by step motion by the second mechanism, a distance register in a third compartment, and a record receiving device controlled by the casing top.

9. In a passenger register for vehicles, in combination with the seats, and seat cushions therein, a casing having a pivoted top, mechanism controlled by movement of the seat cushions to actuate the pivoted top, a passenger register, a time register and a distance register contained in each casing, a spring actuated roller journaled on one end of the casing, another roller journaled on the other end of the casing, said rollers carrying a fabric ribbon, means connected with the casing top to control the action of the spring actuated roller, and an ink ribbon operated by the casing top, said ink ribbon and fabric ribbon being arranged so that the registering devices aforesaid make an impression on the fabric ribbon each time the casing top is actuated.

10. In a passenger register for vehicles, in combination with the seats, and seat cushions therein, a casing having a pivoted top, mechanism controlled by movement of the seat cushions to actuate the pivoted top, a passenger register, a time register and a distance register contained in each casing, a spring actuated roller journaled on one end of the casing, a flange on one end of the roller having a notch therein, a lever fulcrumed on said casing and having one end arranged to engage said notch, a hook secured to the casing top to engage said lever and momentarily disengage it from the notch aforesaid, another roller on the other end of the casing, said roller carrying a fabric ribbon, an ink ribbon operated by the casing top, said ink ribbon and fabric ribbon being arranged so that the registering devices aforesaid make an impression on the fabric ribbon each time the casing top is actuated.

11. In a passenger register for vehicles, in combination with the seats, and seat cushions therein, a casing having a pivoted top, mechanism controlled by movement of the seat cushions to actuate the pivoted top, a passenger register, a time register and a distance register contained in each casing, a roller having a ratchet wheel secured thereto journaled at one end of the casing, another roller journaled on the other end of the casing, an ink ribbon secured to said rollers, an arm secured to the casing top, a pawl pivotally secured to said arm and engaging said ratchet wheel, other rollers secured to the casing and operated by the casing top, said last mentioned rollers having a fabric ribbon secured thereto, said ink ribbon and fabric ribbon being arranged so that the registering devices aforesaid make an impression on the fabric ribbon each time the casing top is actuated.

12. In a passenger register for vehicles, in combination with the seats, and seat cushions therein, a casing having a pivoted top, mechanism controlled by movement of the seat cushions to actuate the pivoted top, a passenger register, a time register and a distance register contained in each casing, a spring actuated roller journaled on one end of the casing, a flange on one end of the roller having a notch therein, a lever fulcrumed on said casing and having one end arranged to engage said notch, a spring actuated pin mounted in the other end of the lever, a hook secured to the casing top and arranged to engage said spring actuated pin and momentarily disengage it from the notch aforesaid, a roller mounted on the other end of the casing, said rollers carrying a fabric ribbon, a roller journaled on one end of the casing and having a ratchet wheel secured thereto, a roller journaled on the other end of the casing and an ink ribbon secured to said rollers, said ink ribbon being arranged between the registering devices and fabric ribbon aforesaid, and an arm on the casing top having a pawl secured thereto to engage the ratchet wheel aforesaid.

13. A passenger register for vehicles comprising seat cushions pivotally secured, supports pivotally secured to said cushions and fitting in sockets in the seats, casings having pivoted tops, an electro magnet for actuating each top, broken circuits connected with said electromagnets, contact buttons secured in the sockets in the seats and connected with the ends of said broken circuits, contact buttons electrically connected and secured to the seat supports, said buttons being positioned to engage the contact buttons in the sockets and close the circuit with the electro-magnet in circuit therewith, a passenger register comprising recording wheels operated by the casing top, a time register having recording wheels operated by a clock work, a distance register having a series of recording wheels geared to the wheels of the vehicle, all of said registers contained in the casing, rollers journaled on the ends of the casing and having a paper ribbon secured thereto, one of said rollers being spring actuated and having its action controlled by the casing top, other rollers also journaled on the ends of the casing having an ink ribbon mounted thereon, one of the last mentioned rollers having a ratchet wheel secured thereto, and a pawl connected with the casing top and engaging said ratchet wheel, said paper and ink ribbons passing between the casing and its top so that an impression is made on the paper ribbon by the registering devices each time the top is actuated by the electro-magnets aforesaid.

In testimony whereof I hereto affix my signature in the presence of two witnesses.

HARVEY E. PIM.

Witnesses:
JOHN J. LEDWITH,
W. M. MORNING.